United States Patent [19]

Groff

[11] 3,979,154
[45] Sept. 7, 1976

[54] TRACK WHEEL FOR CRAWLER TYPE VEHICLES

[75] Inventor: Eugene R. Groff, Chillicothe, Ill.

[73] Assignee: Caterpillar Tractor Co., Peoria, Ill.

[22] Filed: Oct. 14, 1975

[21] Appl. No.: 622,335

[52] U.S. Cl. .................................. 305/21; 74/443; 301/6 WB
[51] Int. Cl.² ............................................ B60B 3/12
[58] Field of Search ........................ 305/21, 23–25, 305/27, 28, 32, 56, 57; 301/5 R, 63 DD, 63 DT, 6 WB; 74/230.8, 230.01, 230.3, 230.05, 230.5, 443

[56] References Cited
UNITED STATES PATENTS

| 1,404,395 | 1/1922 | Ibach | 301/63 DD |
| 1,441,005 | 1/1923 | Ledwinka | 301/63 DD |
| 2,320,163 | 5/1943 | Anderson | 301/63 DD X |
| 3,847,444 | 11/1974 | Aker | 305/21 X |

Primary Examiner—Robert B. Reeves
Assistant Examiner—John P. Shannon
Attorney, Agent, or Firm—Frank L. Hart

[57] ABSTRACT

A track wheel of a crawler type vehicle has a plurality of first and second plates spaced at preselected locations for suppressing vibration of and resultant noise emitting from panels of the wheel.

10 Claims, 2 Drawing Figures

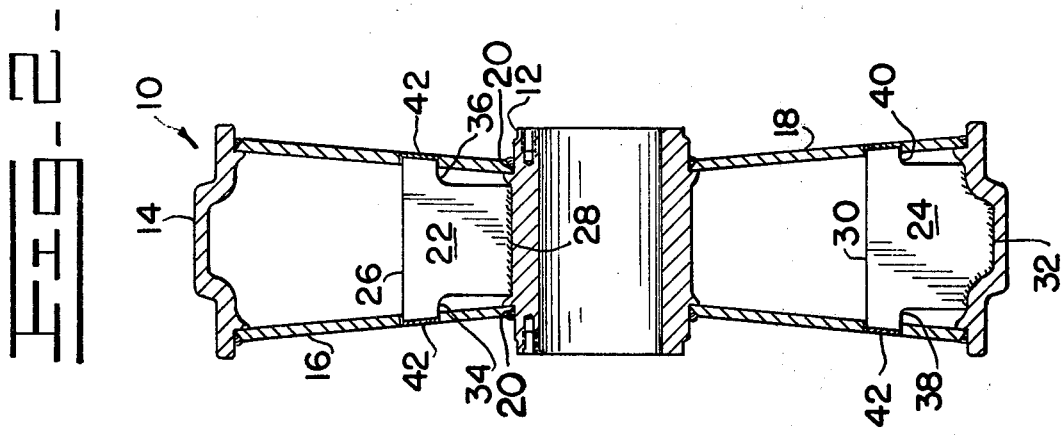
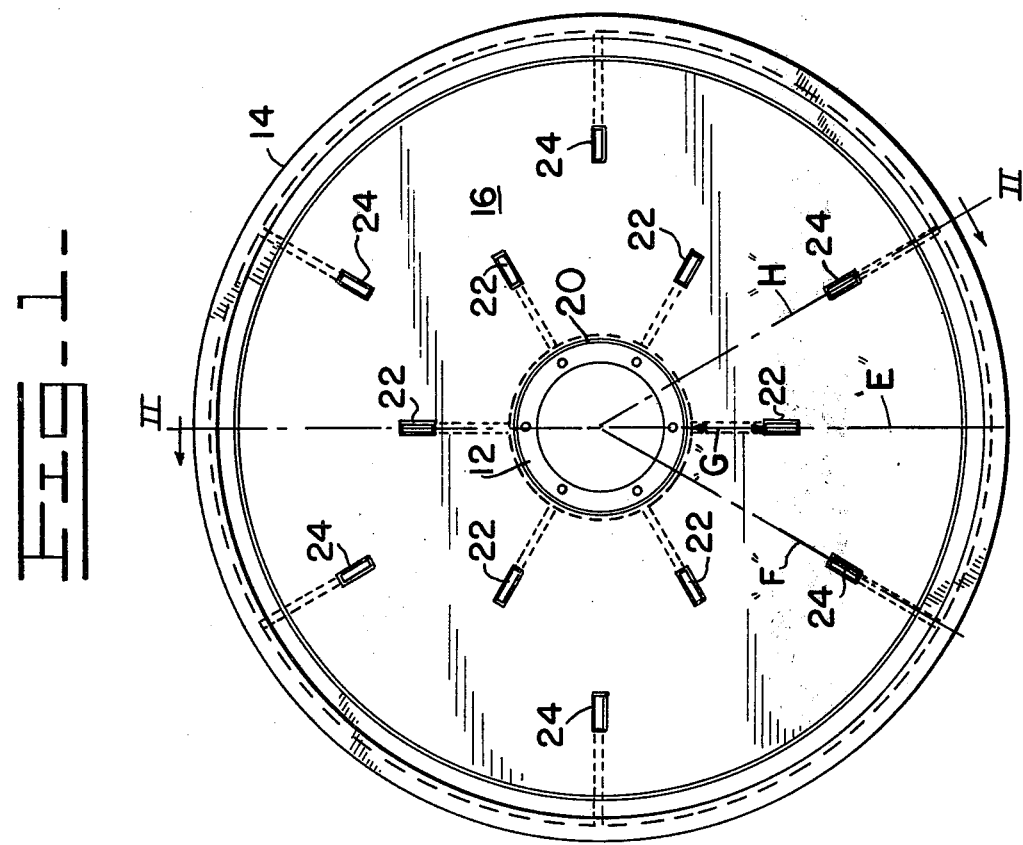

TRACK WHEEL FOR CRAWLER TYPE VEHICLES

BACKGROUND OF THE INVENTION

Crawler tractors, for example, are provided with power driven chains on either side of the tractor frame, made up of a plurality of pivotally linked shoes suspended over a rear drive sprocket and supported by wheels. The weight of the machine is carried on the lower run of the chains. The track wheels are therefore subjected to a wide variety of impacts and forces which cause the wheels to deflect, vibrate, and emit undersirable noise.

Since work vehicles of this type are often used in highly populated areas, it is desirable to provide idler or other wheels which do not produce disturbing noises.

This invention therefore resides in a unique construction of track wheels which have elements which function to supress vibrations of the wheels.

BRIEF DESCRIPTION OF THE DRAWINGS

FIG. 1 is a diagrammatic frontal view of an example idler wheel of this invention; and FIG. 2 is a diagrammatic sectional view taken along line II—II of FIG. 1.

DETAILED DESCRIPTION OF THE INVENTION

Referring to the drawings, wheels 10, for example idler wheels, are associated with the continuous track of a crawler type vehicle, as is known in the art. The wheel 10 is constructed with a hub member 12 connected to an annular rim 14 by first and second spaced apart idler panels 16,18.

The idler panels 16,18 each have a central opening 20 and are connected about their outer periphery to the rim 14 and about their central opening 20 to the hub 12. A plurality of first and second plates 22,24 are each connected to the idler panels 16,18 for stabilizing the panels 16,18 against deflection.

Each of the plates 22,24 have respective first and second ends 26,28 and 30,32 and opposed flanges 34,36 and 38,40 extending outwardly from the first ends 26,30.

The flanges 34,36 of the first plates 22 are each connected to respective first and second panels 16,18 with their second ends 28 each connected to the hub 12. The flanges 38,40 of the second plates 24 are each connected to respective first and second panels 16,18 with their second ends 32 each connected to the rim 14.

In the installed position, the plates 22,24 are positioned at preselected spaced positions relative one to the others. Preferably, the plates 22,24 each extend radially outwardly relative to the hub 12. However, it should be understood that the plates can be oriented differently relative to a radial plane of the hub without departing from this invention. The flanges 38,40 of the second plates 24 are also positioned a greater distance from the hub than the flanges 36,38 of the first plates 22.

As can be better seen in FIG. 2, the preferred plates 22,24 are each of a general "T" configuration and the flanges 34,36,38,40 each extend into a respective opening 42 in a respective panel 16,18 and are fixedly connected thereto by welding, for example.

To suppress vibrations, the flanges of the first and second plates 22,24 are connected to the panels at locations at which the radial plane, "E" for example, of at least one, preferably all of the first flange connecting locations on each panel are arcuately spaced from the radial planes "F" and "H" for example, of the second flange locations on the respective panel. Preferably, this spacing is common and the first plates 22 are connected at substantially the median of the arcuate distance between adjacent second plates 24. Further, the radial distances "G" from the hub 12 to the connecting locations of the first plates 22 are in a range of about one-third to about two-thirds, preferably about one-half times the radial distance between the hub member 12 and the rim 14.

The flanges 34,36 of the first plates 22 can be connected to the panels 16,18 at locations at which the arcuate distance between adjacent connecting locations of first flanges and second flanges on each panel are each substantially equal.

By so constructing the wheel of this invention, the frequency of the idler panels 16,18 is effectively shifted to a frequency that is at least 1.2, more preferably 2.0 or more times the critical frequency of the panels 16,18. By the term "critical frequency" it is meant the frequency at which the propagation speed of the bending wave in the panel is the same as the speed of sound in air. Therefore, as the thickness and size of the panel changes, the critical frequency of the panel changes. Hence, after the variable of the panel have been determined, the number of first and second plates utilized can be readily determined for assuring moving the panel's resonance frequency to a value 1.2, or greater, times the critical frequency.

It should be understood that the hub 12, rim 14, panels 16,18, and associated plates 22,24 can be a unitary element without departing from this invention.

Other aspects, objects and advantages will become apparent from a study of the drawing, the disclosure, and the appended claims.

What is claimed is:

1. A wheel for carrying continuous track chains of crawler type vehicles, comprising:
   a hub member;
   an annular rim;
   first and second spaced panels each connecting the hub to the rim;
   a plurality of first plates each having first and second ends and opposed outwardly extending flanges on the first end, said flanges each being connected to respective first and second panels and each second end being connected to the hub with said first plates being positioned at spaced locations; and
   a plurality of second plates each having first and second ends and opposed outwardly extending flanges on the first end, said flanges each being connected to respective first and second panels, each second end being connected to the rim with said second plates being positioned at spaced locations, said flanges of said second plates being a greater distance from said hub than said flanges of said first plates, and said second plates being arcuately spaced from radial planes of the first plates.

2. A wheel, as set forth in claim 1, wherein the first and second plates are of a general T configuration.

3. A wheel, as set forth in claim 1, wherein the flanges of the first and second plates extend into a respective opening in a respective panel.

4. A wheel, as set forth in claim 1, wherein the flanges of the first plates are connected to the panels at locations at which the arcuate distances between adjacent first and adjacent second flange connecting locations are substantially equal.

5. A wheel, as set forth in claim 1, wherein the flanges of the second plates are connected to the panels at locations at which the arcuate distances between adjacent first and second flange connecting locations are substantially equal.

6. A wheel, as set forth in claim 5, wherein the flanges of the first plates are connected to the panels at locations at which the arcuate distances between adjacent first and second flange connecting locations are substantially equal.

7. A wheel, as set forth in claim 1, wherein the radial distances from the hub to the connecting location of the first flanges are in the range of about one-third to about two-thirds times the radial distances between the hub and the rim.

8. A wheel, as set forth in claim 1, wherein the radial distance from the hub to the connecting locations of the first flanges is about median the radial distance between the hub and the rim.

9. A wheel, as set forth in claim 1, wherein the radial planes passing through the first plates are at a median distance between radial planes passing through the adjacent second plates.

10. A wheel, as set forth in claim 1, wherein the frequency of the wheel panels is at least 1.2 times the critical frequency of said wheel panels.

* * * * *